(12) United States Patent
Wolleschensky et al.

(10) Patent No.: US 7,554,664 B2
(45) Date of Patent: Jun. 30, 2009

(54) LASER SCANNING MICROSCOPE

(75) Inventors: Ralf Wolleschensky, Jena (DE);
Wolfgang Bathe, Jena (DE); Joerg Steinert, Jena (DE); Dieter Huhse, Berlin (DE)

(73) Assignee: Carl Zeiss Microimaging GmbH, Jena (DE)

( * ) Notice: Subject to any disclaimer, the term of this patent is extended or adjusted under 35 U.S.C. 154(b) by 0 days.

(21) Appl. No.: 11/878,998

(22) Filed: Jul. 30, 2007

(65) Prior Publication Data
US 2008/0024782 A1  Jan. 31, 2008

(30) Foreign Application Priority Data
Jul. 28, 2006  (DE) .................. 10 2006 034 908

(51) Int. Cl.
*G01N 21/25* (2006.01)
(52) U.S. Cl. .................. 356/417; 359/618; 359/629
(58) Field of Classification Search ........... 356/417; 359/618, 629, 634, 636, 639
See application file for complete search history.

(56) References Cited
U.S. PATENT DOCUMENTS

| | | | |
|---|---|---|---|
| 5,515,169 A * | 5/1996 | Cargill et al. .............. 356/417 |
| 6,222,961 B1 | 4/2001 | Engelhardt et al. |
| 6,563,632 B1 | 5/2003 | Schoeppe et al. |
| 7,362,425 B2 * | 4/2008 | Meeks et al. ............... 356/73 |
| 2005/0017197 A1 | 1/2005 | Ulrich |

FOREIGN PATENT DOCUMENTS

| | | |
|---|---|---|
| DE | 19633185 A1 | 8/1996 |
| DE | 19702753 A1 | 1/1997 |
| DE | 10 2004 029733 | 2/2005 |

* cited by examiner

*Primary Examiner*—Gregory J Toatley, Jr.
*Assistant Examiner*—Abdullahi Nur
(74) *Attorney, Agent, or Firm*—Jacobson Holman PLLC

(57) ABSTRACT

Laser Scanning Microscope with an illumination beam path for illumination of a sample and a detection beam path for wavelength-dependent recording of the light from the sample, whereby filters for selection of the detection wavelengths are provided, characterized in that at least one graduated filter spatially variable in regard to the threshold wavelength between the transmission and reflection is provided in several partial beam paths for the selection of the wavelengths.

13 Claims, 2 Drawing Sheets

DE2

DE2

LASER SCANNING MICROSCOPE

BACKGROUND OF THE INVENTION (1) Field of the Invention

The present invention relates to Laser Scanning Microscopes in general and to Laser Scanning Microscopes with an illumination beam path for illumination of a sample and a detection beam path for wavelength-dependent recording of the light from the sample, whereby filters for selection of the detection wavelengths are provided, in particular.

(2) Description of Related Art Including Information Disclosed Under 37 CFR 1.97 and 1.98

In a Laser Scanning Microscope (LSM), lasers of different performance classes are used. Further, a Laser Scanning Microscope is characterized by a large number of variable modules, which serve as detector or for illumination. In FIG. 1, a beam path of an LSM is shown schematically.

An LSM comprises essentially 4 modules as shown on FIG. 1: Light sources LS, scan module SM, detection unit DU and microscope MS. These modules are described in detail in the following. In addition to that, please refer to DE 19702753A1 and U.S. Pat. No. 6,563,632 B1, which are incorporated by reference herein as if reproduced in full.

In an LSM, for the specific excitation of the various dyes in a specimen, lasers with different wavelengths are used. Selection of the excitation wavelength is based on the absorption characteristics of the dyes to be examined. The excitation radiation is generated in the light source module LS. For that, different lasers are used (argon, argon krypton, TiSa laser). Further, the selection of the wavelengths and the adjustment of the intensity of the required excitation wavelengths take place in the light source module, for example, by using an acousto-optical crystal. After that, passing through a fiber or a suitable mirror arrangement, the laser beam reaches into the scanning module SM. After passing through the scanner, the laser beam generated in the light source is focused diffraction-limited on the specimen by the objective, the scanning optics and the tube lens. The focus scans the specimen point-by-point in x-y direction. The pixel dwell times during the scanning through the specimen lie mostly in the range of less than one microsecond to a few 100 microseconds.

In confocal detection (descanned detection) of fluorescence light, the light, which is emitted from the focal plane of the specimen and from the planes lying above and below it, reaches, passes through the scanner, to a dichroic beam splitter MDB. The latter separates the fluorescence light from the excitation light. Thereafter, the fluorescence light is focused on a diaphragm (confocal diaphragm/pinhole) which is located exactly in a plane conjugate to the focal plane. As a result, parts of the fluorescence light beam outside the focus are suppressed.

By varying the size of the diaphragm, the optical resolution of the microscope MS can be adjusted. Behind the diaphragm, there is another dichroic filter block EF, which suppresses the excitation beam once again. After passing the filter block, the fluorescence light is measured by means of a point detector PMT.

If multiphoton absorption is used, the excitation of the dye fluorescence takes place in a small volume in which the excitation intensity is particularly high. This region is only insignificantly larger than the detected region, if a confocal arrangement is used. Use of a confocal diaphragm can thus be dispensed with and the detection can take place directly after the objective (non-descanned detection).

In another arrangement for the detection of dye fluorescence excited by multiphoton absorption, descanned detection does take place like before, however, this time the pupil of the objective is imaged into the detection unit (non-confocal descanned detection).

Of a three-dimensionally illuminated image, only that plane (optical cross section) is reproduced in both detection arrangements in context of the corresponding one-photon or multiphoton absorption, which lies in the focal plane of the objective. Finally, by recording several optical sections in the x-y plane at different depths z of the sample, a computer-aided three-dimensional image of the specimen can be generated.

The LSM is thus suitable for the examination of thick specimens. The excitation wavelengths are determined by the used dye according to its specific absorption characteristics. The dichroic filters tuned to the emission characteristics of the dye ensure that only the fluorescence light emitted from the corresponding dye is measured by the point detector.

In biomedical applications, at present several different cell regions with different dyes are marked with markers at the same time (multifluorescence). In the state-of-the-art, individual dyes can be detected separately either on the basis of different absorption characteristics or emission characteristics (spectra). For that reason, additional splitting of the fluorescence light coming from several dyes by means of secondary beam splitters (DBS) and separate detection of the individual dye emissions in separate point detectors (PMT x) takes place. The LSM LIVE of Carl Zeiss MicroImaging GmbH realizes a very fast line-scanner with image generation of about 120 images per second (http://www.zeiss.de/c12567be00459794/Contents-Frame/fd9fa0090eee01a641256a550036267b).

In general the light source module is connected with the scan module through optical fibers. The coupling in of several independent lasers in a fiber for the transmission to the scan head was described, for instance, in Pawley: "Handbook of Confocal Microscopy", Plenum Press, 1994, page 151 and in DE 19633185 A1.

In the measurement of samples that are marked with two or more fluorescence dyes, using a Laser Scanning Microscope, normally the light emitted from the sample is spectrally split before the actual detection. This takes place usually in such a manner that one partial beam has wavelengths $\lambda$<x nm and the other partial beam has wavelengths $\lambda$>x nm. This is usually achieved by means of the so-called dichroic splitters (long pass filters or short pass filters or dichroic beam splitters). Since the meaningful (or even the optimal) value of x depends on the used dye, filter wheels with several dichroic filters are used in LSM. This is a complicated embodiment, which either must comprise many different dichroic splitters right from the beginning, or is variable only conditionally despite the elaborate layout.

DETAILED DESCRIPTION OF THE INVENTION

Figure 1:
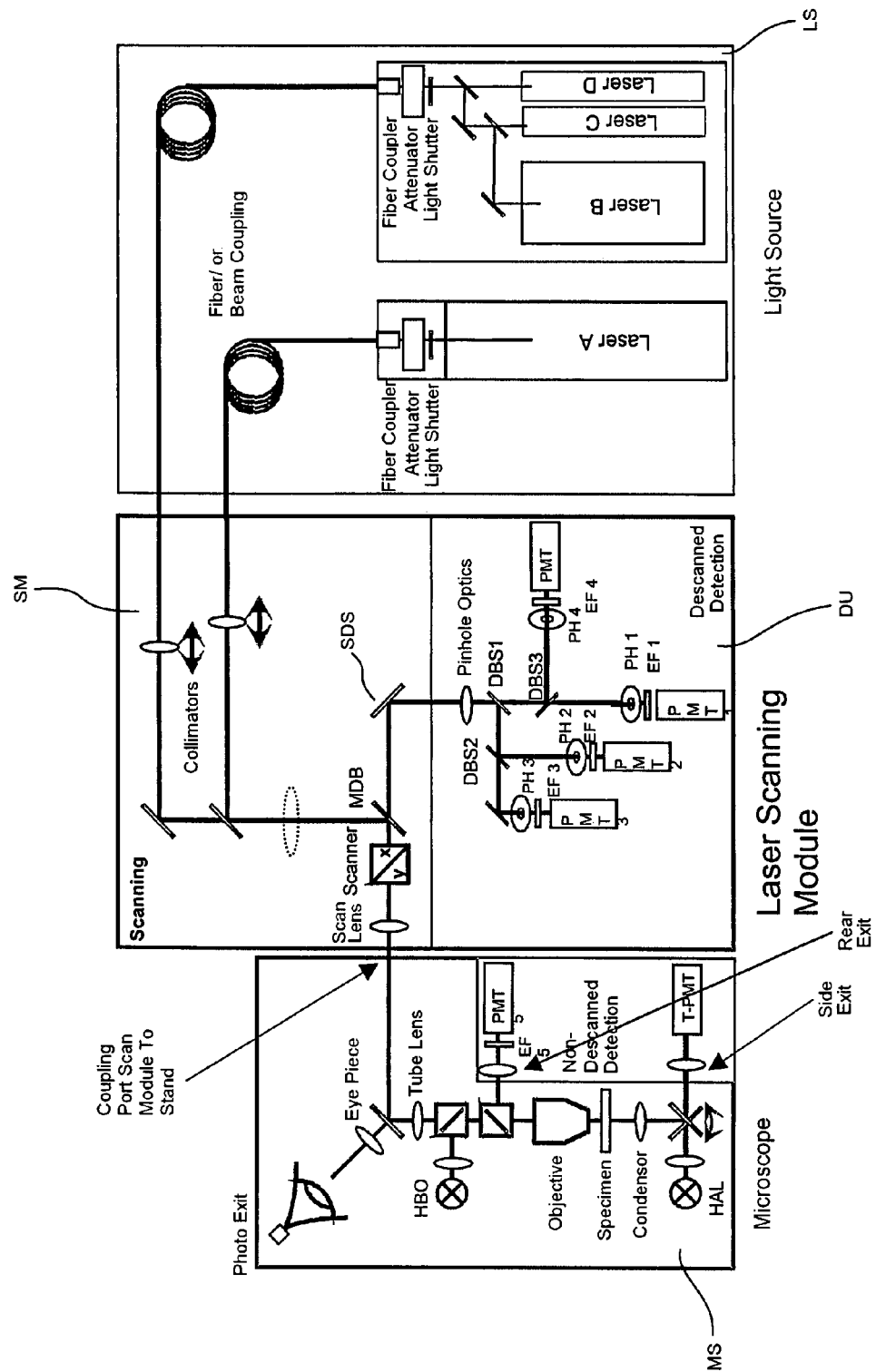
FIG. 1 is a schematic diagram of a prior art Laser Scanning Microscope.

In describing preferred embodiments of the present invention illustrated in the drawings, specific terminology is employed for the sake of clarity. However, the invention is not intended to be limited to the specific terminology so selected, and it is to be understood that each specific element includes all technical equivalents that operate in a similar manner to accomplish a similar purpose.

Figure 2:
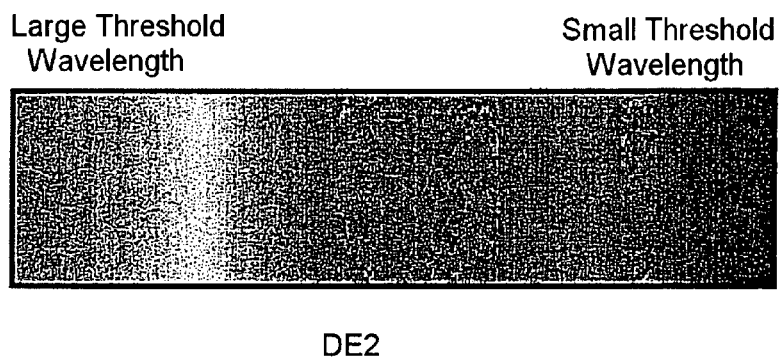
FIG. 2 is a shaded sketch of a graduated filter.

As a flexible secondary beam splitter NFT, a so-called graduated filter (for example short-pass) is used. This is a filter, the threshold wavelengths for the transmission of which varies in dependence of the position of the filter, so that it behaves, for instance, like a short-pass filter with a threshold wavelength 500 nm at one place, while like a short-pass filter with a threshold wavelength of 600 nm at another place as shown in FIG. 2. In it, a graduated filter with continuous variation of the threshold wavelength between the reflective and the transmissive behavior is shown schematically.

Figure 3:
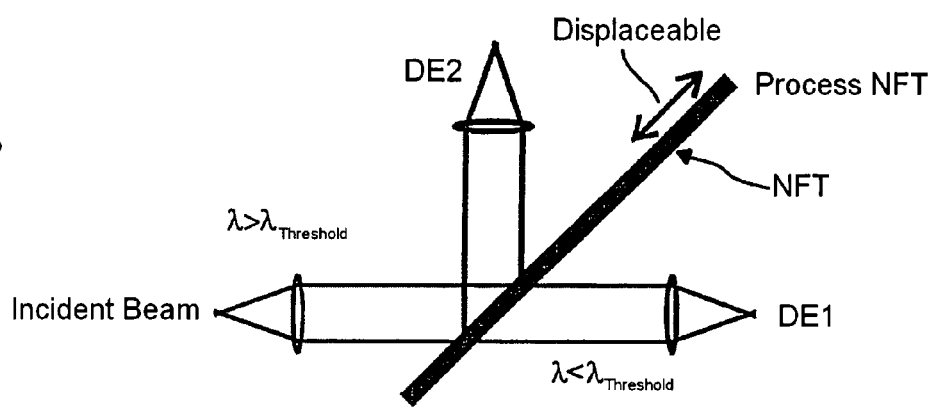
FIG. 3 is a schematic diagram illustrating the principle of a beam path of a flexible NFT with the graduated filter of FIG. 2.
Figure 4:
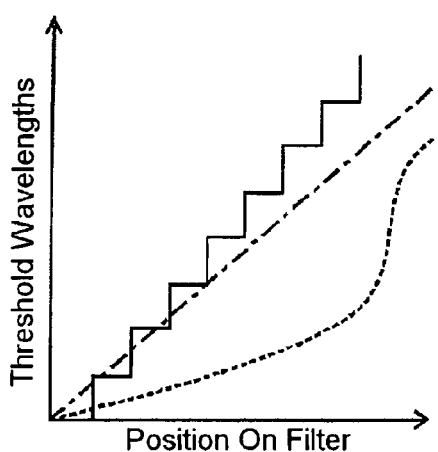
FIG. 4 is a graph illustrating different gradients of threshold wavelength of the graduated filter of FIG. 2.

FIG. 3 shows a sketch in principle of a beam path of a flexible NFT with a graduated filter. The collimated initial incident beam is split by a graduated filter NFT in the direction of two detection beam paths DE1 and DE2.

The graduated filter NFT is located in the direction of the detection behind the main dichroic beam splitter (MDB in FIG. 1), preferably in the beam path at the usual location for a secondary dichroic beam splitter SDS.

The graduated filter NFT is arranged in the detection beam path at an angle, usually at 45 degrees with respect to the optical axis of the incident beam and is movable along that angular position in the beam path in order to vary its optically effective threshold wavelength between transmission (in direction DE1) and reflection (in direction DE2).

Figure 5:
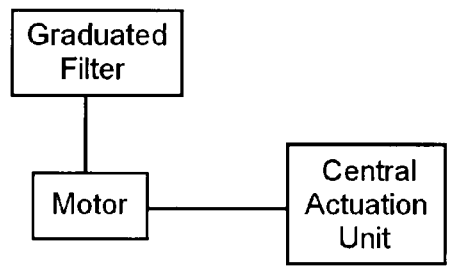
FIG. 5 is a schematic diagram showing displacement operation of the graduated filter.

Therefore, depending on the place where such a filter is illuminated, the transmission characteristic of this filter changes. A flexible NFT can thus be simply realized in that such a graduated filter is arranged displaceably in an otherwise fixed beam path. A sketch of the corresponding embodiment is shown in FIG. 2. The graduated filter, as shown in FIG. 5, is displaceable under motor control. The motor responds to a central actuation unit that may be part of a computer system.

Thus it is of advantage if the spectral splitting of the light does not take spatially in order to thereafter mirror the individual (arranged spatially separately) spectral parts in different directions, and instead of using several filters with fixed threshold wavelength, a graduated filter is used. Thereby the variation of the threshold wavelength of the filter above the cross section of the incident light beam should be smaller than the desired spectral resolution.

Following advantageous modifications of the invention form the subject matter of the present publication:

1. It does not matter whether it involves a short pass or a long pass graduated filter. In one case, the shorter wavelengths go to detector DE1 and the longer ones to detector DE2, and in the other case, it is the other way round;
2. A part of the filter can also be embodied as a glass plate without any filtering properties (the light passes through the NFT unobstructed, no deflection of light to the second branch) or as a mirror (complete deflection of light to the second branch);
3. The filter can be designed with a linear (displaceable) form or, for instance, like a wheel (disk, rotatable);
4. Instead of being continuous, the filter can be coated with a number of different filters in steps, or some parts of the filter can be in steps and the other parts can be continuous; and
5. Band passes are also conceivable in place of the short pass or long pass characteristics.

Variation of the wavelength can be adapted according to the desired spectral resolution and need not necessarily be linear, concrete jumps in the threshold wavelengths are shown in FIG. 3.

Modifications and variations of the above-described embodiments of the present invention are possible, as appreciated by those skilled in the art in light of the above teachings. It is therefore to be understood that, within the scope of the appended claims and their equivalents, the invention may be practiced otherwise than as specifically described.

The invention claimed is:

1. A laser scanning microscope for viewing a sample, the laser scanning microscope comprising:
    an optical axis;
    means for producing illumination rays along the optical axis for illuminating the sample;
    a first detection beam path for passing light from the sample;
    a second detection beam path for passing light from the sample;
    first filter means for selecting first detection-wavelengths from the first beam path, wherein at least one graduated filter spatially variable in regard to the threshold wavelength between transmission and reflection is provided in the first detection beam path for the selection of the first detection-wavelengths; and
    second filter means for selecting second detection-wavelengths from the second beam path, wherein at least one graduated filter spatially variable in regard to the threshold wavelength between transmission and reflection is provided in the second detection beam path for the selection of the second detection-wavelengths.

2. The Laser Scanning Microscope according to claim 1, further comprising means for disposing the graduated filter is a displaceable manner in the first detection beam path so as to enable variation of the optically effective threshold wavelength of the graduated filter in the first detection beam path.

3. The Laser Scanning Microscope according to claim 2, further comprising a central actuation unit for controlling the displacement of at least one of the graduated filters.

4. The Laser Scanning Microscope of according to claim 3, wherein the displacement of at least one of the graduated filters is controlled by a motor receiving signals from the central actuation unit.

5. The Laser Scanning Microscope according to claim 3, wherein the central actuation unit provides for flexible assignment of the detection-wavelengths.

6. The beam splitter according to claim 1, wherein at least one of the graduated filters comprises at least partially continuous spatial variation of the threshold wavelength between the reflected and the transmitted part of the detection light.

7. The beam splitter according to claim 1, wherein at least one of the graduated filters exhibits at least in part step-wise spatial variation of the threshold wavelength between the reflected and the transmitted part of the detection light.

8. The beam splitter according to claim 1, wherein at least one of the graduated filters is a short-pass filter, a long-pass filter or a band-pass filter.

9. The Laser Scanning Microscope according to claim 2, further comprising means for disposing the graduated filter is a displaceable manner in the second detection beam path so as to enable variation of the optically effective threshold wavelength of the graduated filter in the second detection beam path.

10. A laser scanning microscope for viewing a sample, the laser scanning microscope comprising:

an optical axis;

means for producing illumination rays along the optical axis for illuminating the sample;

means for producing a detection beat path for wave-dependent recording of light from the sample;

filter means for selecting the detection-wavelengths, wherein at least one graduated filter spatially variable in regard to the threshold wavelength between transmission and reflection is provided in the detection beam path for the selection of the detection-wavelengths;

means for disposing the graduated filter is a displaceable manner in the detection beam path so as to enable variation of the optically effective threshold wavelength of the graduated filter;

a central actuation unit for providing variable assignment of the detection wavelengths to provide signals to control the displacement of the graduated filter; and a motor receiving the signals from the central actuation unit for controlling the displacement of the graduated filter.

11. The beam splitter according to claim 10, wherein the graduated filter comprises at least partially continuous spatial variation of the threshold wavelength between the reflected and the transmitted part of the detection light.

12. The beam splitter according to claim 10, wherein the graduated filter exhibits at least in part step-wise spatial variation of the threshold wavelength between the reflected and the transmitted part of the detection light.

13. The beam splitter according to claim 10, wherein the graduated filter is a short pass filter, a long-pass filter or a band-pass filter.

* * * * *